United States Patent Office 3,399,115
Patented Aug. 27, 1968

3,399,115
QUALITATIVE BACTERIA CULTURE MEDIUM IDENTIFICATION
Walter M. Sellers, Jr., 525 S. Pinto St.,
San Antonio, Tex. 78207
No Drawing. Filed Feb. 14, 1966, Ser. No. 528,026
3 Claims. (Cl. 195—103.5)

The invention described herein may be manufactured and used by or for the United States Government for governmental purposes without the payment to me of any royalty thereon.

This invention relates to a single culture medium for assisting in accomplishing the differentiation and the identification of stipulated gram negative nonfermentative bacteria of hospital importance, as well as certain other pathogenic micro-organisms.

The object of the present invention is to provide a single culture medium which, with 24 hours, will substantially distinguish from one another and identify the following species of bacteria of hospital importance: *Pseudomonas aeruginosa, Herellea vaginicola, Bacterium anitratum, Mimapolymorpha*, and *Alcaligenes faecalis*. This object has not been known to have been accomplished previously with any other culture medium. The process presumes the primary isolation of cultures of optimum purity.

The intended identification is accomplished with reference to the following chart:

aqueous 50.0 percent glucose solution is added per tube (2 drops from a 10 ml. pipette). The butt is stabbed and the slant streaked in the usual procedure that is used to inoculate other tubed media having a slant and deep butt.

Although several of the components of the medium could be varied both quantitatively and qualitatively and still allow results similar to those outlined above under the title, "How Accomplished," the composition given apparently produces the best balanced medium. This opinion was arrived at after a considerable amount of testing.

Not only is no single medium available, as previously stated, for the identification of all of these nonfermentative bacteria, but neither is a single medium available for the identification of any one of them except for *Ps. aeruginosa*. Two commercial media are available (since January 1962) as specific aids in identifying *Ps. aeruginosa*. Each of these two media depends upon a single characteristic (pyocyanine or fluorescein production) for the identification. If a particular strain fails on one of these media to produce the characteristic feature (and some do for each medium), it will not be identified by that medium. The described medium has several parameters so that if one characteristic should not occur, the others are available to still make the identification.

Advantage has been taken of the following facts in developing this medium (most of these are from my reearch; some are available in the literature).

Some strains of *Pseudomonas aeruginosa* can reduce nitrate but not nitrite to gaseous nitrogen of the symbol $N_2$;

HOW ACCOMPLISHED

| | Color of slant | Color at junction of butt and slant | Color of butt | $N_2$ gas production (blue or green butt and agar cracked) | Greenish yellow fluorescent slant | Bluish-white fluorescence at junction of butt and slant |
|---|---|---|---|---|---|---|
| Uninoculated medium | Green | Green | Green | Negative | Negative | Negative. |
| Pseudomonas aeruginosa | Olive | Blue | Blue | Positive | Positive | Do. |
| Herellea vaginicola | Blue | Yellow | Green | Negative | Negative | Positive. |
| Bacterium anitratum typical strains | do | do | do | do | do | Negative. |
| Bacterium anitratum strains unable to attack L-arginine. | Yellow | do | do | do | do | Do. |
| Mima polymorpha | Blue | Blue | do | do | do | Do. |
| Alcaligenes faecalis | do | do | Blue | Positive | do | Do. |

MEDIUM COMPOSITION PER LITER

| | | |
|---|---|---|
| Water | ml | 1000 |
| Sodium chloride | grams | 2.0 |
| Sodium nitrate | do | 1.0 |
| Sodium nitrite | do | 0.35 |
| D-mannitol | do | 2.0 |
| L-arginine | do | 1.0 |
| Yeast extract | do | 1.0 |
| Magnesium sulfate $7H_2O$ | do | 1.5 |
| Potassium phosphate $3H_2O$ (dibasic) | do | 1.0 |
| Bacto peptone | do | 20.0 |
| Phenol red | do | 0.008 |
| Brom thymol blue | do | 0.040 |
| Bacto agar, pH adjusted to 6.7 | do | 15.0 |

Gram negative fermentative bacteria of hospital importance can be distinguished by their yellow butts with this medium; this also includes those species which cannot ferment mannitol.

The ingredients of the above medium composition per liter are dissolved in the water, taking care to dissolve the magnesium sulfate and the potassium phosphate in small amounts of the water separately before adding them to the medium to avoid formation of an insoluble magnesium phosphate precipitate. The medium composition is boiled to dissolve the agar and is tubed in amounts sufficient to make 1½ inch butts and 3 inch slants before being autoclaved for 10 minutes at 15 pounds pressure. Immediately before being inoculated, 0.15 ml. of a sterile, others can reduce nitrite but not nitrate to $N_2$; the majority can reduce both to $N_2$. Very few species of bacteria submitted to hospital laboratories are capable of producing $N_2$ (probably only *Pseudomonas aeruginosa* and *Alcaligenes faecalis*). Although an obligate aerobe under strict conditions, *Ps. aeruginosa* can grow anaerobically in the presence of nitrate and produce sufficient ammonia in the described medium to change a pH indicator (alkaline butt). *Pseudomonas aeruginosa* is very proteolytic and prefers peptone to glucose as an energy source, hence the alkaline junction with this medium.

Mannitol is second only to glucose as a carbohydrate energy source for *Ps. aeruginosa* and has the advantage that it stimulates fluorescein production better than other carbohydrates. It is a nonreducing sugar and thus does not interfere with the anaerobic growth of *Ps. aeruginosa* in this medium.

The small amount of glucose added to the slanted tubes before inoculation allows the powerful glucose oxidizers, *Bacterium anitratum, Herellea vaginicola*, to produce an acid (yellow) area in the immediate vicinity, while *Pseudomonas aeruginosa*, a less powerful glucose oxidizer, does not do so because of the high peptone content. The small amount of glucose transmitted to the butt by the stab inoculation is sufficient to cause fermentative organisms to produce acid (yellow) butts even if they do not ferment the mannitol (i.e., *Proteus vulgaris* or *P. mirabilis*).The glucose drops also stimulate *Herellea vaginicola* to produce a fluorescence in the immediate vicinity.

Bibasic potassium phosphate stimulates $N_2$ production. Three-tenths of one percent was best for $N_2$ formation but 0.1% was used because it was almost as good for $N_2$ production; its less buffering effect allowed a faster pH indicator change in the butts (blue color) of the tubes inoculated with Pseudomonas aeruginosa or Alcaligenes faecalis; it had less tendency to form a precipitate in the presence of magnesium sulfate than did the higher concentration.

Magnesium sulfate stimulates fluorescein production by Pseudomonas aeruginosa. Fifteen-hundredths of one percent was the optimum concentration. Less caused a decrease in fluorescence; more tended to precipitate the phosphate in this medium.

Sodium nitrate 0.3% produced the greatest $N_2$ gas production with most Pseudomonas aeruginosa strains. Even through they produced less gas 0.1% $NaNO_3$ was used since the 0.3% concentration was toxic for a few strains of this species and interferred with the glucose oxidation by Bacterium anitratum and Herellea vaginicola and with fermentation by Proteus species.

Sodium nitrite 0.035% was optimum; more was toxic and less was ineffective with a number of Pseudomonas aeruginosa strains.

Mima polymorpha, Herellea vaginicola, and Bacterium anitratum are obligate aerobes even in the presence of nitrate. Therefore they are incapable of growing in the butt of the tubes and therefore the pH indicator remained unchanged (green) in the butts. Alcaligenes faecalis is a facultative anaerobe and produced an alkaline (blue) butt, as did Pseudomonas aeruginosa (although it is an obligate aerobe) because the nitrate allowed it to grow anaerobically.

As far as is presently known, this is the only culture medium that is capable of differentiating and of identifying the gram negative, nonfermenting bacteria that is of importance in hospital work.

The process described herein is more reliable for the identification of Pseudomonas aeruginosa than are the two known commercial media that are designated for this purpose. The reasons that the process described herein is believed to be more reliable than commercially available media are in the identification of the bacterial cultures that are designated herein are: (a) the process disclosed herein does not depend upon a single characteristic for the identification; (b) the disclosed process is at least as efficient in stimulating fluorescein production as is the commercial medium for the same purpose; (c) more strains of Pseudomonas aeruginosa produce fluorescein than product pyocyanine; (d) of the 150 species of Preudomonas, several species produce fluorescein, several soil species produce gaseous nitrogen, and only Ps. aeruginosa will produce both gaseous nitrogen and fluorescein.

It is to be understood that similarly functioning modifications may be made in the preferred medium composition that is disclosed herein and that expansions may be made in the bacteria that may be subsequently identified by the composition that is disclosed herein without departing from the spirit and scope of the present invention.

I claim:

1. The qualitative bacteria culture medium identification composition per liter that is substantially:

| | | |
|---|---|---|
| Water | ml | 1000 |
| Sodium chloride | grams | 2.0 |
| Sodium nitrate | do | 1.0 |
| Sodium nitrite | do | 0.35 |
| D-mannitol | do | 2.0 |
| L-arginine | do | 1.0 |
| Yeast extract | do | 1.0 |
| Magnesium sulfate $7H_2O$ | do | 1.5 |
| Potassium phosphate $3H_2O$ (dibasic) | do | 1.0 |
| Bacto peptone | do | 20.0 |
| Phenol red | do | 0.008 |
| Brom thymol blue | do | 0.040 |
| Bacto agar pH adjusted to 6.7 | do | 15.0 |

2. The process of using the culture medium defined in claim 1 for the differentiation and the identification of gram negative nonfermentative bacteria that is accomplished by subjecting the bacteria to the application of the composition defined by claim 1 and applying the observed resultant phenomena to the following chart for the identifying of the unknown bacteria:

HOW ACCOMPLISHED

| | Color of slant | Color at junction of butt and slant | Color of butt | $N_2$ gas production (blue or green butt and agar cracked) | Greenish-yellow fluorescent slant | Bluish-white fluorescence at junction of butt and slant |
|---|---|---|---|---|---|---|
| Uninoculated medium | Green | Green | Green | Negative | Negative | Negative. |
| Pseudomonas aeruginosa | Olive | Blue | Blue | Positive | Positive | Do. |
| Herellea vaginicola | Blue | Yellow | Green | Negative | Negative | Positive. |
| Bacterium anitratum typical strains | do | do | do | do | do | Negative. |
| Bacterium anitratum strains unable to attack L-arginine | Yellow | do | do | do | do | Do. |
| Mima polymorpha | Blue | Blue | do | do | do | Do. |
| Alcaligenes faecalis | do | do | Blue | Positive | do | Do. |

3. The process of applying to an unknown bacterial culture substantially the medium composition defined in claim 1 and observing the resultant action of the unknown bacterial culture in arriving at the identification of the unknown bacterial culture by colorimetric change, the release of fluorescein, the release of gaseous nitrogen, and by the proteolytic action of the unknown bacterial culture.

References Cited

UNITED STATES PATENTS 3,278,393  10/1966  Bahn et al. _____ 195—100

A. LOUIS MONACELL, Primary Examiner.

L. SCHENKMAN, Assistant Examiner.